(12) United States Patent
Yen

(10) Patent No.: US 6,589,615 B1
(45) Date of Patent: Jul. 8, 2003

(54) THERMOPLASTIC FOOD CASING

(75) Inventor: William W. Yen, 51 Alton St., Arlington, MA (US) 02474

(73) Assignee: William W. Yen, Arlington, MA (US)

( * ) Notice: Subject to any disclaimer, the term of this patent is extended or adjusted under 35 U.S.C. 154(b) by 0 days.

(21) Appl. No.: 09/225,023

(22) Filed: Jan. 4, 1999

(51) Int. Cl.$^7$ .......................... A22C 11/00; B65D 65/46
(52) U.S. Cl. .................. 428/34.8; 264/41; 264/209.1; 426/105; 426/129; 426/135; 426/138; 426/143; 426/277; 426/278; 428/34.9; 428/412; 428/475.2; 428/480; 428/500; 428/521; 428/522; 428/523
(58) Field of Search ................... 428/34.8, 36.9, 428/412, 475.2, 480, 500, 521, 522, 523; 426/105, 129, 135, 138, 143, 277, 278; 138/118.1; 264/209.1, 41

(56) References Cited

U.S. PATENT DOCUMENTS

| | | | |
|---|---|---|---|
| 3,784,004 A | 1/1974 | Meyer | 206/80 A |
| 3,852,224 A | * 12/1974 | Bridgeford | 260/2.5 |
| 3,890,447 A | 6/1975 | Shatney | 426/105 |
| 3,932,693 A | 1/1976 | Shaw et al. | 428/518 |
| 4,004,075 A | 1/1977 | Richmond et al. | 526/342 |
| 4,514,472 A | 4/1985 | Vrouenraets | 428/220 |
| 4,546,023 A | 10/1985 | Kastl et al. | 428/36 |
| 4,820,533 A | 4/1989 | Seaborne et al. | 426/76 |
| 4,897,274 A | 1/1990 | Candida et al. | 426/127 |
| 4,949,430 A | 8/1990 | Stanek | 17/41 |
| 4,952,431 A | * 8/1990 | Robertson et al. | 428/34.8 |
| 5,015,521 A | 5/1991 | Fujii et al. | 428/220 |
| 5,063,104 A | 11/1991 | Robertson et al. | 428/286 |
| 5,221,571 A | 6/1993 | Cammiss et al. | 428/220 |
| 5,374,457 A | 12/1994 | Juhl et al. | 428/34.1 |
| 5,376,392 A | 12/1994 | Ikegami et al. | 426/127 |
| 5,419,962 A | 5/1995 | Robertson et al. | 428/348 |
| 5,480,690 A | * 1/1996 | Stenger et al. | 428/34.8 |
| 5,484,001 A | 1/1996 | Gray | 141/114 |
| 5,584,997 A | 12/1996 | Yagihashi et al. | 210/321.79 |
| 5,773,105 A | 6/1998 | Klett | 428/34.7 |
| 5,807,630 A | 9/1998 | Christie et al. | 428/323 |

* cited by examiner

*Primary Examiner*—Sandra M. Nolan
(74) *Attorney, Agent, or Firm*—Samuels, Gauthier & Stevens, LLP

(57) ABSTRACT

A porous food casing consisting essentially of a film of food grade thermoplastic having a plurality of interconnected interstices therein. The interstices are defined by a porosity modifier selected from the group consisting of soybean oil, peanut oil, corn oil, glycerin, polyethylene glycol, monolaurate, mineral oil, polyoxyethylene, sorbitan monostearate, sorbitan monooleate and glycerol monooleate. The interstices are in a range of approximately 0.002 to 1 micron and the casing has a water vapor permeability in a range of about 1 to 1500 gms/m$^2$/min.

40 Claims, No Drawings

THERMOPLASTIC FOOD CASING

FIELD OF THE INVENTION

The invention relates to casings for the preservation and/or flavoring of processed foods, e.g. processed meats.

DESCRIPTION OF THE RELEVANT ART

Foods are often processed, i.e. cooked, in a plastic film package by for example at least partially immersing the package in hot water or placing the package in a steam-heated environment. The processed food package may then be refrigerated until the processed food is to be consumed. During the meat cooking process (e.g. frankfurter or smoked turkey breast), excess water vaporizes though the casing to ambient while smoke or other modifiers for color and/or flavor are diffused through the casing into the meat.

The current standard industry food casing is made of cellophane in a tubular form. The starting material is generally wood-pulp. It is saturated in an 18% sodium hydroxide solution to swell the cellulose structure. The wood-pulp is subsequently reacted with carbon disulfide to form a paste, named "viscose". The viscose is aged (or ripened) prior to the actual formation of the film. To produce the cellophane film, the first step is to extrude the viscose through a circular die. The tube shape viscose is then immersed in a 20 weight percent sodium sulfate and 2 weight percent sulfuric acid solution to coagulate the structure. The next step is to regenerate the coagulated tube by reacting the material with a 10 weight percent sulfuric acid solution. The film is subsequently washed and softened with glycerin to produce the final casing product. The object of this cellophane processing is to take cellulose in one form (a thermal-set polymer fiber) and convert it into a usable porous film. The current estimate is that 50 percent of the carbon disulfide used in the cellulose casing process is converted into pollutants and by-products of the various forms.

The standard thermoplastic bag is not porous. Casing manufacturers have tried to stretch the thermoplastic film to produce the necessary porosity, however this effort has so far been largely unsuccessful.

Casing manufacturers have developed thermoplastic casings which allow the migration of water vapor and smoke. However, these thermoplastic casings have not gained wide acceptance because of expense, poor porosity and poor migration of flavor and color modifiers. These enhancements can, of course, be accomplished in a separate processing step(s), e.g. by placing the processed food in a smoke house. However, this requires additional processing steps.

U.S. Pat. No. 5,374,457 provides a detailed description of thermoplastic casings which contain additives which impart taste or modify the appearance of processed food. In one instance, this reference teaches that melt blending glycerin (liquid smoke) with silica and EVA resin was not a successful combination.

It would be desirable to provide a thermoplastic casing which can be used as an enclosure for processing enclosed food and also as a vehicle for simultaneously transferring modifiers to the food surface during processing.

SUMMARY OF THE INVENTION

The casing embodying the invention is based on a process which does not require chemical reactions to produce the casing. The casing is "environmentally clean", has a long shelf life, is not susceptible to bacteria and mold attack as are prior art casings and the casing can also be recycled. The casing can be used as packaging for foods including but not limited to meats, whole or processed, and other produce, vegetables, dairy products, carbohydrates, etcetera.

Broadly the invention comprises combining a food grade thermoplastic with a porosity modifier. The porosity modifier is mixed with the thermoplastic to form a single phase polymer mixture. The mixture is extruded as a sleeve. When the mixture is cooled, the two components undergo phase separation. The porosity modifier defines a network of interconnected interstices (pores or channels) in the thermoplastic which allow a permeate to permeate across (through) the casing and/or allow additives embedded in the casing to flow from the casing to a food product. The interstices are in the range of 0.002 to 1 micron. Prior to use as a casing, the porosity modifier can be either extracted from the thermoplastic or remain in situ.

The casing has a permeability to water vapor of between 1 to 1500 gms/m$^2$/min (standard). The presence, in whole or in part, of the porosity modifier in the casing, will affect the flow of additives into the food. However, when a porosity modifier is present in the casing, it is selected to ensure water vapor and the selected additives will permeate through or from the casing to the food.

In a preferred embodiment of the invention, an inorganic filler is used to impart structural integrity to the casing.

DESCRIPTION OF THE PREFERRED EMBODIMENT(S)

In a preferred embodiment, Nylon is melted and mixed with glycerin and silica to form a single phase polymeric mixture. The mixture is then extruded through a circular die to form a tubular casing. The Nylon and glycerin go through a phase separation process when the mixture cools from the melt temperature to room temperature. The glycerin forms a network of interconnected interstices in the casing. During cooking of a meat product in the casing, the water vapor permeates through the Nylon casing because the water is soluble in the glycerin channels. Smoke can also be transported through the casing based on the same mechanism. The Nylon casing can be water washed to extract the glycerin in whole or in part. The casing derives the needed casing porosity based on dynamics of the Nylon/glycerin (polymer/plasticizer) interaction.

In an alternative embodiment, polypropylene is mixed with soybean oil and silica. The soybean oil can be extracted from the casing in a hexane bath. This can improve the diffusion of the water vapor and additives.

Thermoplastics that can be used are selected from the group consisting of polyethylene, polypropylene, polyvinylidene chloride, polyamide, polystyrene, polyethylene terephthalate, polyvinyl polymer, ethylene vinyl polymer, polycarbonate or polybutene. The amount of thermoplastic in the casing is in a range of approximately 5 to 95% by weight based on the total weight of the casing, preferably 15 to 75%. These polymers have a molecular weight in a range of approximately 10,000 to 5,000,000, preferably 11,000 to 500,000, a density in a range of approximately 0.8 to 1.8, preferably 0.89 to 1.20, a melting point in a range of approximately 100 and 300° C., preferably 115 to 265° C., a tensile modulus in a range of approximately 25,000 to 500,000 psi, preferably 140,000 to 410,000, a Rockwell hardness in a range of approximately R30 to R130 and from M60 to M-130, and a glass transitional temperature in a range of approximately −130 to 150° C.

As will be well understood by one skilled in the art, the polymer may be cross linkable, such as by irradiation, to improve the strength of the film casing. Additives such as anti-oxidants, slip agents, blocking agents and peeling aids can be used to enhance processing of the casing and/or the physical properties of the final product. Antioxidants and antimycotic agents can be used to improve the shelf life of the food products.

The casing can be produced by conventional extrusion or blown film processes. The casing can be multi-layered, e.g. a porous nylon film on top of a porous polypropylene film. The interstices in the casing are in a range of approximately 0.002 to 1 micron, preferably 0.005 to 0.2 micron, the casing can have a thickness in a range of approximately 0.5–15 mils, preferably 1 to 5 and a permeability to water vapor in a range of approximately 1 to 1500 gms/m$^2$/min, preferably 100 to 1000.

Porosity modifiers that can be used are selected from the group consisting of soybean oil, peanut oil, corn oil, glycerin, polyethylene glycol 400, monolaurate, mineral oil or surfactants including polyoxyethylene (POE) 20, sorbitan monostearate (TWEEN 20), POE 80, sorbitan monooleate (MAZ 80), glycerol monooleate. The amount of the porosity modifier in the casing is in a range of approximately 95 to 5% by weight based on the total weight of the casing, preferably 70 to 30% by weight. The porosity modifiers have a density in a range of approximately 0.8 to 1.3.

Inorganic fillers that can be used are selected from the group consisting of silica (SiO$_2$), talc (Mg$_2$SiO$_4$), aluminum oxide, hydrated alumina, titanium oxide, zirconium oxide, sodium silicate, silicate, sodium chloride, calcium, calcium carbonate, clay and calcined clay. The amount of the inorganic filler in the food casing is in a range of approximately 0 to 85% by weight based on total weight of the casing, preferably 0 to 40%. The inorganic filler has a particle size in a range of approximately 1 to 25 microns, preferably 2 to 10 and a density in a range of approximately 1.4 to 5.7, preferably 2.0 to 2.7.

Flavorants and/or fragrances can be added to the casing and comprise liquid smoke extract, vanilla extract, annatto extract, food spices and other food flavor and fragrance extracts. The amount of flavorant and/or fragrances in the casing can be in a range of approximately 1 to 80% by weight, preferably 1 to 40% based on the total weight of the casing. Liquid smoke extract can be neutralized to minimize the oxidation on the thermoplastic casing.

The colorants that can be added to the casing comprise caramel, food dyes, brown sugar and any of the food colorants that are FDA approved for food contact or use. The amount of colorant in the casing can be in a range of approximately 1 to 80% by weight, preferably 1 to 40% based on the total weight of the casing.

A flavorant, fragrance and/or colorant enhanced casing can be laminated or extruded onto a non-porous, non-flavored, non-fragrance and non-colored packaging film. A porous thermoplastic casing can be laminated or extruded onto a non-woven web to improve the strength of the casing.

The preferred method of the invention is to melt the thermoplastic and mix it with silica, colorant, flavorant (liquid smoke) and porosity modifier to form a mixture. The mixture forms a single phase material in an extruder. The mixture is then extruded through a circular die to form the tubular casing (or it can be extruded through a sheet die to form a film. The two edges of the film can be heat sealed together to form a tubular casing). The thermoplastic and the plasticizer go through a phase separation process during cooling. The porosity additive and liquid flavorant form the interstices in the casing. During the cooking of the meat product, the smoke and/or flavor is transported from the casing onto the meat product.

An alternative method to produce a flavorant, fragranced or colored thermoplastic casing is to extrude a casing with the porosity modifier. The porosity modifier can be removed by extraction. The flavorant, fragrance and/or colorant can be absorbed into the casing by coating. The flavorant, fragrance and/or colorant will occupy the interstices of the casing.

The mixing of the thermoplastic, the filler and the porosity modifier is usually accomplished by a "twin screw" extruder. Pellets are produced from the twin screw extruder. The pellets are then be fed to a single screw extruder to produce the final casing. Standard blown film method or the "double bubble" technique may be used to produce the tubular casing.

The end use of the casing will determine what strength and porosity is required based on how the food is to be processed in the casing. Also, the porosity will be affected by the choice of colorants and/or flavorings. The porosity modifiers may remain in the casing, be partly extracted or fully extracted.

In the following non-limiting examples, silica or talc is premixed with a porosity modifier (generally one part silica to two parts modifier) in a "dry-blend" mixer. The silica/modifier mixture is then fed to an extruder along with the thermoplastic and additional porosity modifier. The materials are melted into a single phase molten mixture. The casing material is formed by extruding the mixture either as pellets or a flat film.

EXAMPLE 1

The following samples 7071-2, 7071-3 and 7071-17 illustrate the amount of porosity modifier that can be extracted from the casing while the casing remains structurally integral, e.g. the casing can be used for its intended purpose.
Material:
Polypropylene (grade PP4772E1), Exxon Corp.
Nylon 6,6, Wellman Corp.
Silica (Hi-Sil ABS), PPG Industries, Inc.
Soybean oil, Oasis Foods Company.
Glycerin (Optim, grade 99.7%, #02171), CP Hall Company.
Equipment:
Kitchen Aid Mixer (Proline Mixer). Used to mix oil (e.g. glycerin or soybean oil) and inorganic filler (e.g. silica).
Twin Screw Extruder (ZSK-30), Krupp Werner & Pfleiderer Corporation, used to melt and mix all the ingredients.
Carver Press, Fred S. Carver Incorporated to press the plastic melt into film.

| | Formulation and samples produced: | | | | | |
|---|---|---|---|---|---|---|
| Sample # | 7071-1 | 7071-2 | 7071-3 | 7071-7 | 7071-10 | 7071-17 |
| Polypropylene wt % | 67% | 48% | 62% | 50% | 44% | 0% |
| Nylon 6, 6 wt % | 0% | 0% | 0% | 0% | 0% | 77% |
| Silica wt % | 0% | 0% | 0% | 0% | 13% | 0% |
| Soybean oil wt % | 33% | 52% | 38% | 20% | 26% | 0% |
| Glycerin wt % | 0% | 0% | 0% | 30% | 17% | 23% |
| Resulting product | strands | 3–5 mil film | 3–5 mil film | strands | strands | 3–5 mil film |

-continued

Formulation and samples produced:

| Sample # | 7071-1 | 7071-2 | 7071-3 | 7071-7 | 7071-10 | 7071-17 |
|---|---|---|---|---|---|---|
| Oil or glycerin extracted to test for resulting porosity | Not extracted | 48% | 36% | Not extracted | Not extracted | 20% |
| Calculated total porosity and porosity modifier by volume (%) | 32% | 51% | 37% | 45% | 43% | 21% |

EXAMPLE 2

Material:
Polypropylene (grade PP4772E1), Exxon Corp.
Nylon 6 (grade NYCOA 589), Nyltech North America.
Nylon 12 (grade Grilamid L25), EMS-American Grilon Inc.
Silica (VN3 Supernox 325C), Degussa Corporation.
Talc, Luzenac Inc.
Soybean oil, Oasis Foods Company.
Glycerin (Optim, grade 99.7%, #02171), CP Hall Company.

Equipment used:
Kitchen Aid Mixer (Proline Mixer). Used to mix oil (e.g. glycerin or soybean oil) and inorganic filler (e.g. silica).
Twin Screw Extruder (ZSK-30), Krupp Werner & Pfleiderer Corporation, used to melt and mix all the ingredients.
Carver Press, Fred S. Carver Incorporated, used to press the plastic melt into film.

Formulation and samples produced:

| Sample # | 7126-2 | 7126-6* | 7126-8 | 7126-12 | 7126-13 | 7126-16** |
|---|---|---|---|---|---|---|
| Polypropylene wt % | 50% | 37% | 0% | 0% | 0% | 0% |
| Nylon 12 wt % | 0% | 0% | 57% | 0% | 0% | 0% |
| Nylon 6 wt % | 0% | 0% | 0% | 63% | 55% | 33% |
| Silica wt % | 0% | 0% | 0% | 0% | 0% | 11% |
| Talc wt % | 0% | 19% | 14% | 0% | 0% | 0% |
| Soybean oil wt % | 50% | 44% | 0% | 0% | 0% | 0% |
| Glycerin wt % | 0% | 0% | 29% | 37% | 45% | 56% |
| Resulting product | 3–5 mil film and pellets | 3–5 mil film and pellets | strands | 3–5 mil film and pellets | 3–5 mil film and pellets | 3–5 mil film and pellets |
| Calculated total porosity modifier by volume % | 49% | 50% | 27% | 35% | 43% | 57% |

A 1.5 mil polypropylene film (7126-6) had a water vapor diffusion rate of 358 grams/m$^2$/min. The soy bean oil from the polypropylene was completely removed prior to measuring the diffusion rate.

A 4.5 mil nylon film (7126-16) had a water vapor diffusion rate of 222 grams/m$^2$/min. The nylon film was first washed in water to remove excess surface glycerin. These tests were based on the "Standard Test Methods For Water Vapor Transmission of Materials" (ASTM E96). Samples were tested at 100° C.

EXAMPLE 3

Material:

Pellet samples, KWP trial #7126.

Equipment used:
One inch single screw extruder, Killion Extruders, a Crompton & Knowles Company.
Cast Film Take-up, Killion Extruders.

Formulation and samples produced:

| Sample # KWP sample | A1 #7126-2 | A2 #7126-2 | A3 #7126-2 | B1 #7126-6 | B2 #7126-6 | B3 #7126-6 |
|---|---|---|---|---|---|---|
| Cast Film Line Speed (FPM) | 2.5 | 7 | 15 | 2.5 | 7 | 15 |
| Film Thickness (mil) | 3 | 1 | 0.5 | 3 | 1 | 0.5 |

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A porous food casing consisting essentially of:
   a film of food grade thermoplastic having a plurality of interconnected interstices therein, the interstices defined by a porosity modifier, the porosity modifier present in the casing in a range of approximately 70 to 30% by weight based on total weight of the casing and being selected from the group consisting of soybean oil, peanut oil, corn oil, glycerin, polyethylene glycol, monolaurate, mineral oil, polyoxyethylene, sorbitan monostearate, sorbitan monooleate and glycerol monooleate, the interstices in a range of approximately 0.002 to 1 micron, the casing having a water vapor permeability in a range of about 1 to 1500 gms/m$^2$/min.

2. The casing of claim 1 wherein the water vapor permeability is in a range of approximately 100 to 1000 gms/m$^2$/min.

3. The casing of claim 1 wherein the thermoplastic is selected from the group consisting of polyethylene, polypropylene, polyvinylidene chloride, polyamide, polystyrene, polyethylene terephthalate, polycarbonate and polybutene.

4. The casing of claim 1 further consisting essentially of an inorganic filler.

5. The casing of claim 4 wherein the inorganic filler is selected from the group consisting of silica ($SiO_2$), talc ($Mg_2SiO_4$), aluminum oxide, hydrated alumina, titanium oxide, zirconium oxide, sodium silicate, silicate, sodium chloride, calcium, calcium carbonate, clay or calcined clay.

6. The casing of claim 1 further consisting essentially of additives.

7. The casing of claim 6 wherein the additives comprise flavorants selected from the group consisting of liquid smoke extract, vanilla extract, annatto extract or food spices.

8. The casing of claim 6 wherein the additives comprise colorants selected from the group consisting of caramel, food dyes or brown sugar.

9. The casing of claim 5 wherein the amount of inorganic filler in the casing is in a range of approximately 0 to 40% by weight based on the total weight of the casing.

10. The casing of claim 1 wherein the casing has a thickness in a range of approximately 0.5 to 15 mils.

11. A method for forming a thermoplastic casing to be used to enclose a food product consisting essentially of:
    mixing a food grade thermoplastic and a porosity modifier to form a single phase polymeric mixture, the porosity modifier present in the casing in a range of approximately 70 to 30% by weight based on the total weight of the casing and being selected from the group consisting of soybean oil, peanut oil, corn oil, glycerin, polyethylene glycol, monolaurate, mineral oil, polyoxyethylene, sorbitan monostearate, sorbitan monooleate or glycerol monooleate;
    extruding the mixture to form a casing; and
    effecting a phase separation of the food grade thermoplastic and the porosity modifier to impart to the casing a network of interconnected interstices, the interstices in a range of approximately 0.002 to 1 micron, the casing having a water vapor permeability in a range of about 1 to 1500 gm/m$^2$/min.

12. The method of claims 11 wherein the thermoplastic is selected from the group consisting of polyethylene, polypropylene, polyvinylidene chloride, polyamide, polystyrene, polyethylene terephthalate, polycarbonate and polybutene.

13. The method of claims 11 further consisting essentially of:
    adding an inorganic filler to the mixture.

14. The method of claim 13 wherein the inorganic filler is selected from the group consisting of silica ($SiO_2$), talc ($Mg_2SiO_4$), aluminum oxide, hydrated alumina, titanium oxide, zirconium oxide, sodium silicate, silicate, sodium chloride, calcium, calcium carbonate, clay and calcined clay.

15. The method of claim 11 further consisting essentially of:
    adding additives to the mixture.

16. The method of claim 15 wherein the additives comprise flavorants selected from the group consisting of liquid smoke extract, vanilla extract, annatto extract and food spices.

17. The method of claim 15 wherein the additives comprise colorants selected from the group consisting of caramel, food dyes and brown sugar.

18. The method of claim 16 wherein the amount of inorganic filler in the casing is in a range of approximately 0 to 40% by weight based on the total weight of the casing.

19. The method of claim 11 wherein the casing has a thickness in a range of approximately 0.5 to 15 mils.

20. The casing of claim 3 wherein the thermoplastic is multi-layered.

21. The casing of claim 20 wherein the thermoplastic comprises a porous polyamide and a porous polypropylene film.

22. The method of claim 11 wherein the water vapor permeability is in a range of about 100 to 1000 gms/m$^2$/min.

23. The method of claim 11 further consisting essentially of:
    extracting at least a portion of the prorsity modifier from the casing.

24. A porous food casing comprising:
    a film of food grade thermoplastic having a plurality of interconnected interstices therein, the interstices defined by a porosity modifier, the porosity modifier present in the casing in a range of approximately 70 to 30% by weight based on total weight of the casing and being selected from the group consisting of soybean oil, peanut oil, corn oil, glycerin, polyethylene glycol, monolaurate, mineral oil, polyoxyethylene, sorbitan monostearate, sorbitan monooleate and glycerol monooleate, the interstices in a range of approximately 0.002 to 1 micron, the casing having a water vapor permeability in a range of about 1 to 1500 gms/m$^2$/min;
    additives; and
    a non-porous, non-flavored, non-fragrance and non-colored packaging film laminated or optionally extruded on to the thermoplastic.

25. A porous food casing comprising:
    a film of food grade thermoplastic having a plurality of interconnected interstices therein, the interstices defined by a porosity modifier, the porosity modifier present in the casing in a range of approximately 70 to 30% by weight based on total weight of the casing and being selected from the group consisting of soybean oil, peanut oil, corn oil, glycerin, polyethylene glycol, monolaurate, mineral oil, polyoxyethylene, sorbitan monostearate, sorbitan monooleate and glycerol monooleate, the interstices in a range of approximately 0.002 to 1 micron, the casing having a water vapor permeability in a range of about 1 to 1500 gms/m$^2$/min;
    additives; and a non-woven web, the thermoplastic and non-woven web forming a laminate.

26. A porous food casing consisting essentially of:
a film of food grade thermoplastic having a plurality of interconnected interstices therein, the interstices defined by a porosity modifier selected from the group consisting of soybean oil, peanut oil, corn oil, glycerin, polythylene glycol, monolaurate, mineral oil, polyoxyethylene, sorbitan monostearate, sorbitan monooleate and glycerol monooleate, the interstices in a range of approximately 0.002 to 1 micron, the casing having a water vapor permeability in a range of about 1 to 1500 gms/m$^2$/min; and
an inorganic filler.

27. The casing of claim 26 wherein the inorganic filler is selected from the group consisting of silica ($SiO_2$), talc ($Mg_2SiO_4$), aluminum oxide, hydrated alumina, titanium oxide, zirconium oxide, sodium silicate, silicate, sodium chloride, calcium, calcium carbonate, clay or calcined clay.

28. The casing according to claim 26 wherein the thermoplastic is present in the casing in a an amount in a range of approximately 5 to 95% by weight.

29. The casing of claim 27 wherein the amount of inorganic filler in the casing is in a range of approximately 0 to 85% by weight based on the total weight of the casing.

30. The casing of claim 26 wherein the casing has a thickness in a range of approximately 0.5 to 15 mils.

31. A porous food casing consisting essentially of:
a film of food grade thermoplastic having a plurality of interconnected interstices therein, the interstices defined by a porosity modifier selected from the group consisting of soybean oil, peanut oil, corn oil, glycerin, polyethylene glycol, monolaurate, mineral oil, polyoxyethylene, sorbitan monostearate, sorbitan monooleate and glycerol monooleate, the interstices in a range of approximately 0.002 to 1 micron, the casing having a water vapor permeability in a range of about 1 to 1500 gms/m$^2$/min;
and additives.

32. The casing of claim 31 wherein the additives comprise flavorants selected from the group consisting of liquid smoke extract, vanilla extract, annatto extract or food spices.

33. The casing of claim 31 wherein the additives comprise colorants selected from the group consisting of caramel, food dyes or brown sugar.

34. The casing of claim 31 wherein the thermoplastic is multi-layered.

35. The casing of claim 34 further consisting essentially of a non-porous, non-flavored, non-fragrance and non-colored packaging film laminated to or optionally extruded on to the thermoplastic.

36. The casing of claim 34 wherein the casing comprises a laminate having at least a first and second layer, the first layer comprised of the thermoplastic and the second layer comprised of a non-woven web.

37. A method for forming a thermoplastic casing to be used to enclose a food product consisting essentially of:
mixing a food grade thermoplastic and a porosity modifier to form a single phase polymeric mixture, the porosity modifier selected from the group consisting of soybean oil, peanut oil, corn oil, glycerin, polyethylene glycol, monolaurate, mineral oil, polyoxyethylene, sorbitan monstearate, sorbitan monooleate or glycerol monooleate;

extruding the mixture to form a casing;

effecting a phase separation of the food grade thermoplastic and the porosity modifier to impart to the casing a network of interconnected interstices, the interstices in a range of approximately 0.002 to 1 mircon, the casing having a water vapor permeability in a range of about 1 to 1500 gms/m$^2$/min; and extracting at least a portion of the porosity modifier from the casing.

38. The method of claim 37 further consisting essentially of:
adding additives to the mixture.

39. The casing of claim 38 wherein the additives comprise flavorants selected from the group consisting of liquid smoke extract, vanilla extract, annatto extract or food spices.

40. The casing of claim 38 wherein the additives comprise colorants selected from the group consisting of caramel, food dyes or brown sugar.

* * * * *